United States Patent
Sanchez Ribes et al.

(10) Patent No.: US 12,504,738 B2
(45) Date of Patent: Dec. 23, 2025

(54) BUILDING OBJECTS HAVING FLAT BOTTOM SURFACES

(71) Applicant: Peridot Print LLC, Palo Alto, CA (US)

(72) Inventors: Salvador Sanchez Ribes, Sant Cugat del Valles (ES); Jason C. Hower, Corvallis, OR (US); Jeremy Harlan Donaldson, Corvallis, OR (US); Sergio Puigardeu Aramendia, Sant Cugat del Valles (ES); Marc Garcia Grau, Sant Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 443 days.

(21) Appl. No.: 17/997,184

(22) PCT Filed: May 21, 2020

(86) PCT No.: PCT/US2020/033979
§ 371 (c)(1),
(2) Date: Oct. 26, 2022

(87) PCT Pub. No.: WO2021/236085
PCT Pub. Date: Nov. 25, 2021

(65) Prior Publication Data
US 2023/0205173 A1  Jun. 29, 2023

(51) Int. Cl.
*G05B 19/4099* (2006.01)
*B29C 64/165* (2017.01)
(Continued)

(52) U.S. Cl.
CPC ........ *G05B 19/4099* (2013.01); *B29C 64/393* (2017.08); *B33Y 50/02* (2014.12); *B29C 64/165* (2017.08); *G05B 2219/49023* (2013.01)

(58) Field of Classification Search
CPC ...... G05B 19/4099; G05B 2219/49023; B29C 64/393; B29C 64/165; B29C 64/171;
(Continued)

(56) References Cited

U.S. PATENT DOCUMENTS 8,287,066 B2  10/2012  Jackson et al.
8,718,522 B2  5/2014  Chillscyzn et al.
(Continued)

FOREIGN PATENT DOCUMENTS

CN  110091507 A  8/2019
CN  110621480 A  12/2019
(Continued)

OTHER PUBLICATIONS

Zwier Marijin P. et al., "Design for additive manufacturing: Automated build orientation selection and optimization", Procedia CIRP 55 (2016), pp. 128-133.

*Primary Examiner* — Rami R Okasha
(74) *Attorney, Agent, or Firm* — Michael Dryja

(57) ABSTRACT

A method comprising dividing a build model comprising an object model arranged within a virtual volume into cross-sectional layers along a vertical axis. The layers represent layers of an additive manufacturing process. A set of base layers is identified with each of the base layers comprising a flat bottom surface of the object model. A base characteristic is assigned to the set of base layers. A set of bulk layers is identified which excludes the set of base layers. A bulk characteristic is assigned to the set of bulk layers. An additive manufacturing apparatus is instructed to build a build cake according to the build model, layers and assigned characteristics, so a fluid agent is deposited at a first rate for the set of bulk layers having the bulk characteristic and a second rate, slower than the first rate, for the set of base layers having the base characteristic.

20 Claims, 6 Drawing Sheets

(51) Int. Cl.
*B29C 64/393* (2017.01)
*B33Y 50/02* (2015.01)

(58) Field of Classification Search
CPC ..... B33Y 50/02; B33Y 10/00; G06F 2113/10; G06F 2119/18; G06F 30/20; Y02P 10/25; B22F 10/14; B22F 10/38; B22F 10/80; B22F 12/57
See application file for complete search history.

(56) References Cited

U.S. PATENT DOCUMENTS

| | | | |
|---|---|---|---|
| 9,353,284 | B2 | 5/2016 | Moussa |
| 9,937,663 | B1* | 4/2018 | Goss ................... B29C 64/295 |
| 10,391,705 | B2 | 8/2019 | Sterman et al. |
| 2017/0151722 | A1 | 6/2017 | Prasad et al. |
| 2018/0250885 | A1* | 9/2018 | Mugishima ............ B33Y 50/02 |
| 2018/0275636 | A1 | 9/2018 | Zhao et al. |
| 2018/0297287 | A1 | 10/2018 | Dikovsky et al. |
| 2019/0111619 | A1 | 4/2019 | Schalk et al. |
| 2019/0126606 | A1 | 5/2019 | Fornos et al. |
| 2019/0217543 | A1* | 7/2019 | Pontiller-Schymura ................... B29C 64/371 |
| 2019/0291349 | A1 | 9/2019 | Fornos et al. |
| 2020/0009849 | A1* | 1/2020 | Sands .................. H04N 1/4092 |
| 2020/0298495 | A1 | 9/2020 | Manousakis |

FOREIGN PATENT DOCUMENTS

| | | |
|---|---|---|
| JP | 2015-112836 A | 6/2015 |
| JP | 2017-013351 A | 1/2017 |
| RU | 2656329 C2 | 6/2018 |
| WO | 2019/103750 A1 | 5/2019 |

* cited by examiner

BUILDING OBJECTS HAVING FLAT BOTTOM SURFACES

BACKGROUND

Additive manufacturing systems can be used to manufacture three-dimensional (3D) objects. This can be achieved, for example, by forming successive layers of a build material on a build platform, selectively depositing fluid agents onto portions of those layers, and applying energy to cause those portions of each layer onto which an energy absorbing fluid agent has been deposited to absorb the energy, heat up, melt and coalesce. Upon cooling, the coalesced portions solidify to form the 3D object within a build cake. The way in which the fluid agents are deposited, for example the pattern and/or rate of deposition, may be governed by a build model comprising a model of the object arranged within a virtual volume provided as part of a build instruction, and interpreted and applied by a print controller.

BRIEF DESCRIPTION OF THE DRAWINGS

Examples of the present disclosure will be described with reference to the accompanying Figures, in which.

DETAILED DESCRIPTION

Figure 1:
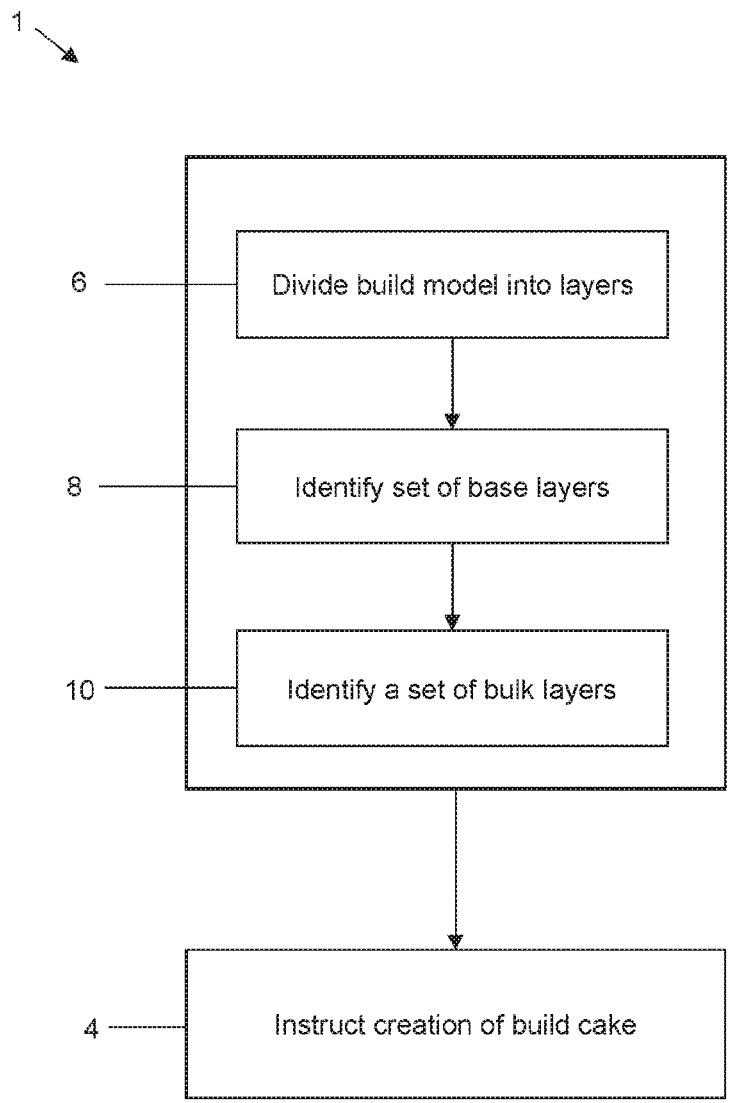
FIG. 1 shows a flowchart of an example method of instructing an additive manufacturing apparatus to build a build cake comprising an object.

FIG. 1 shows a flowchart 1 of an example additive manufacturing method including instructing an additive manufacturing apparatus to create, or build, a build cake comprising an object.

In some examples, the additive manufacturing apparatus is instructed to build a build cake using build material which is spread over a build platform to form a build layer in a build chamber. Selected portions of the build layer are solidified by selectively depositing fluid agents onto the build layer and applying heat energy from an energy source in order to, for example, fuse, sinter, melt, or otherwise join the build material. The fluid agents are deposited by a print head which passes over a surface area of each build layer. The build platform is then lowered by a predetermined amount, a new build layer is formed on the previously formed layer, and the process is repeated. A build cake comprising an object within a volume of non-solidified build material results. The build material may comprise any suitable form of build material, for example fibres, granules or powders. The build material may include thermoplastic, ceramic or metallic materials.

The flowchart 1 includes an example of a method of assigning characteristics to a build model. This method comprises dividing 6 a build model comprising an object model arranged within a virtual volume into cross-sectional layers along a vertical axis. Each layer of this example represents a corresponding layer to be built in an additive manufacturing process, but in other examples may represent sets of layers to be built. The thickness of the layers may be determined based upon resolution desired for the object once built and this may be predetermined, or set by an operator. The object model may be a model of an object of any shape, and the virtual volume may be a model of the chamber within which the build cake comprising the object model is to be built, or a portion thereof.

The example method comprises identifying 8 a set of base layers, each of the base layers comprising a flat bottom surface of the object model, and assigning a base characteristic to the set of base layers. A flat bottom surface is a base of at least a portion of a modelled object, and will be described in more detail below, and a base layer represents a layer in which the flat bottom surface of the object will be built.

A flat bottom surface of the object model arranged in a virtual volume is a portion of the modelled object the building of which will result in the deposition of a fluid agent onto a region of a layer where fluid agents have not been deposited in the build material layer directly beneath, the region having a characteristic above a threshold. The characteristic may be based on an area of the region and/or other dimension of the region. The deposition of a fluid agent onto a layer which is located above a layer in which the matching region comprises non-solidified build material, that is to say build material in which fluid agents have not been deposited, increases the risk of an unacceptable reduction in build quality as discussed in more detail below. In some examples the characteristic is based on the area of the region, and the threshold area size may be about 2 $mm^2$, or may be above 5 $mm^2$. In some examples the characteristic based on the minimum dimension of the region, and the threshold dimension may be that the minimum dimension is above 0.2 mm, or may be above 0.5 mm. For example a long thin rectangular region may have a large area, but a small width may make is less susceptible to quality being adversely affected during a build.

The threshold area size may depend upon the build material and fluid agent being used, the layer thickness, and the desired build quality. The threshold area size may be automatically determined based information provided about the additive manufacturing process, or may be set by an operator. The surface may be internal or external to the object, for example a hollow object may comprise an internal flat bottom surface.

It should be noted that a surface of the object model which comprises a flat bottom surface may not be arranged parallel with the build layers. A surface of the object extending at an angle to the layers may still result in, during a build, the deposition of a fluid agent onto of a region of a layer, the region having an area above a threshold size, with the matching region in the layer below comprising non-solidified build material where fluid agents have not been deposited. This is due to the conversion of an angled surface into a series of steps when the object is sliced into layers. The thickness of the layers will affect the angle at which an object surface can extend and still result in a classification as a flat bottom surface. An angled surface of a build object may result in a plurality of flat bottom surfaces in different layers.

A flat bottom surface of the object may be present in any layer where fluid agents are deposited onto a build layer over an area where fluid agents have not been deposited in the build material layer directly beneath. In some examples a flat bottom surface may be present in any layer where fluid agents are deposited onto a build layer over an area where fluid agents have not been deposited in a plurality of adjacent build material layers directly beneath.

In some examples a flat bottom surface may be identified in a build model by comparing an area in which fluid agents are to be deposited during a build process in a layer with an area in which fluid agents are to be deposited during a build process in an adjacent layer. For any layers in which fluid agents are to be deposited onto a build layer over an area where fluid agents have not been deposited in the build material layer directly beneath, the size and/or dimensions of that area can be compared with the threshold.

When an object is built according to the object model, layers and assigned characteristics using an additive manufacturing process as described above, a first portion of the base layer corresponding to the flat bottom surface of the object is created on a layer of non-solidified build material. The first portion of the base layer is therefore supported by non-solidified build material. When fluid agents are deposited onto the build material of the base layer within the first portion the fluid agents can wet, displace, or otherwise alter the non-solidified material of the layer below and this may result in defects in, or a reduction in quality of, the surface of the finished object. Such defects, or quality reduction, can be avoided, or reduced, by slowing the rate of deposition of fluid agents for the base layers.

In some examples an object model comprises a simple shape, for example, a solid cube. A solid cube, if arranged with a face parallel with the build layers will comprise one flat bottom surface at its base, with the other external surfaces being either vertically oriented, or at the top of the cube and therefore built upon a portion of the layer below which has been substantially solidified. In other examples the object model comprises a more complex shape which comprise surfaces comprising a plurality of flat bottom surfaces, for example, at bases of overhanging or otherwise substantially unsupported portions of the object. For example, a T-shaped object model arranged with the body of the 'T' arranged vertically may comprise three flat bottom surfaces. However, in a 'T' two of these surfaces, those either side of the body, are vertically aligned. This means that the set of base layers identified would be a set of two base layers.

The method further comprises identifying 10 a set of bulk layers from the layers, the set of bulk layers excluding the set of base layers, and assigning a bulk characteristic to the set of bulk layers. The set of bulk layers may comprise all, or a subset of, the layers representing layers to be built in an additive manufacturing process excluding the base layers. As the bulk layers do not comprise a flat bottom surface of the object model, they are not susceptible in the same manner to defects and a higher fluid agent deposition rate can be employed when creating bulk layers.

Assigning a base characteristic to the set of base layers, and a bulk characteristic to the set of bulk layers, enables the layer types to be distinguished from one another during an additive manufacturing process. This allows selective alteration of the fluid agent deposition rate for the process of creating a layer of build cake based on the characteristic assigned to that layer. In some examples this allows a deposition rate to be selected for base layers to produce an acceptable quality surface, while a more rapid fluid agent deposition rate can be employed for bulk layers, which allows them to be completed more quickly, thereby reducing the total time to create a build cake.

Assigning a characteristic to a set of layers may comprise an addition, removal and/or modification of a data 'tag' associated with the layers into which the build model has been divided. In some examples assigning a characteristic to a first set of layers may comprise not adding a data 'tag' associated with the layers in the set within the build model, while for a second set of layers a data 'tag' associated with the layers in the set within the build model is added to differentiate between the two set of layers.

In this example method the additive manufacturing apparatus is instructed to build a build cake according to the build model, layers and assigned characteristics, such that fluid agent is deposited at a first rate for the set of bulk layers having the bulk characteristic and a second rate for the set of base layers having the base characteristic, where the second rate is slower than the first rate. The build model, layers and assigned characteristics may be provided to the additive manufacturing apparatus separately, or the build model may be modified by dividing it into layers and assigning the characteristics thereto to produce a modified build model, the modified build model being provided to the additive manufacturing apparatus.

Figure 2:
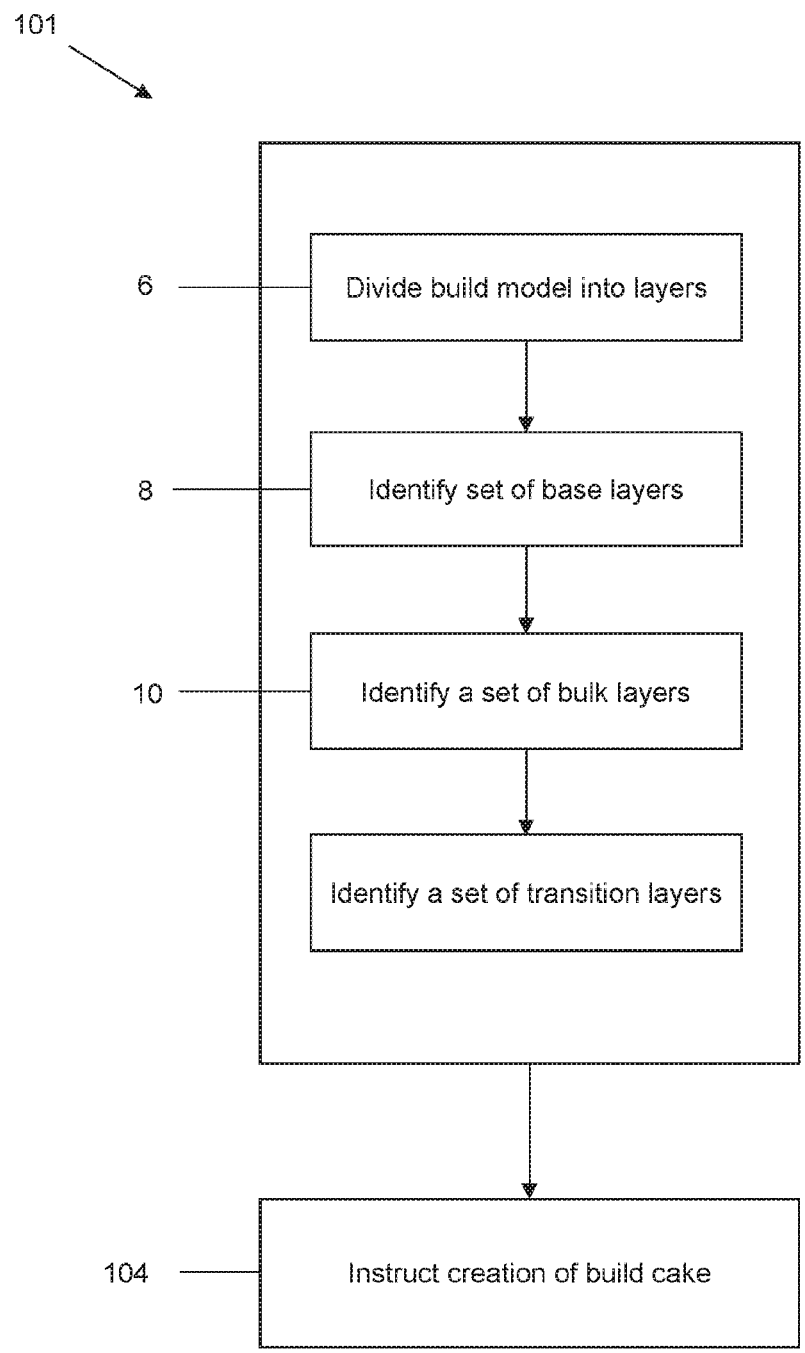
FIG. 2 shows a flowchart of a different example method of instructing an additive manufacturing apparatus to build a build cake comprising an object.

FIG. 2 shows a flowchart 101 of a different example method of instructing an additive manufacturing apparatus to build a build cake comprising an object. The method in this example includes similar elements to the example method of flowchart 1 and the elements are labelled with the same reference numeral. However, the method in this example comprises identifying a set of transition layers within the layers representing layers to be built in the additive manufacturing process, each of the transition layers being adjacent to, and above, a layer of the set of base layers or another transition layer, the set of bulk layers excluding the set of transition layers.

A transition characteristic is assigned to the set of transition layers, and the additive manufacturing apparatus is then instructed to build the build cake according to the build model and assigned characteristics, such that the fluid agent is deposited at a third rate for the set of transition layers having the transition characteristic, wherein the third rate is slower than the first.

The build material of the transition layers, being adjacent to, and above, a base layer, may also be susceptible to uncontrolled movement, thereby increasing the likelihood of defects forming in, or a reduction in quality of, the surface of the object when built. Depositing fluid agents at a slower rate for these transition layers than for the bulk layers may reduce the likelihood of such uncontrolled movement which may affect the quality of the surface of the finished object. The set of transition layers may comprise a plurality of transition layers. The set of transition layers may, for example, comprise two to four layers per base layer.

In some examples the third rate may be the same as the second rate. In other examples, in order to reduce the time taken to complete a layer during the build process, the second rate may be slower than the third rate. The third rate may be constant for each of the transition layers, or may vary between layers. For example, the rate may increase between each successive transition layer.

The rate of deposition of fluid agent may be determined by a number of times a print head passes over a layer in order to deposit a predetermined volume of fluid agent per unit area within the regions of the layer to be solidified.

In some examples, during each pass over a layer the print head may move over a layer at a substantially constant rate, and the rate at which fluid is ejected from the print head can be altered. In some examples the rate which fluid is ejected from the print head to create a solidified portion is constant for a layer.

The rate at which the print head moves over a layer during a pass may be substantially constant, whether ejecting fluid agent or not, for all passes so that each pass takes substantially the same amount of time to complete. The rate may be a volumetric rate, and the base characteristic may be indicative of a greater number of passes being employed to reach the predetermined volume of fluid agent per unit area than the bulk characteristic. For example, a predetermined total volume of fluid per unit area may be deposited during four passes of the print head over a base layer and the same volume of fluid per unit area may be deposited using two passes of a print head over a bulk layer. In this example, the volume of fluid per unit area deposited on the base layer per pass may be 270000 drops per square inch, whereas the volume of fluid per unit area deposited on the bulk layer per pass could be 540000 drops per square inch.

In some examples the transition characteristic is indicative of a greater number of passes than the bulk characteristic. In some examples the transition characteristic is indicative of the same number of passes as the base characteristic. In other examples the transition characteristic is indicative of fewer passes than the base characteristic.

In other examples, the time taken for a pass of the print head over a layer may be varied by changing the rate at which the print head moves over the layer. To reach a predetermined total volume of fluid deposited per unit area of a layer in a single pass the rate at which the fluid is ejected from the print head can be varied inversely with rate of movement. Thus, to reduce the rate at which fluid agent is deposited onto a layer in a single pass the rate of ejection of fluid agent from the print head can be reduced and/or the rate at which the print head passes over the layer can be reduced. The base characteristic may be indicative of a longer time per pass than the bulk characteristic. For example, by halving the rate at which the print head moves over a base layer compared with a bulk layer a first volume of fluid per unit area may be deposited over a base layer within a period of time which is double the time taken to deposit the same volume onto a bulk layer. In some examples the transition characteristic may be indicative of a longer time per pass than the bulk characteristic, and may be indicative of the same length of time per pass as the base characteristic or shorter.

Figure 3A:
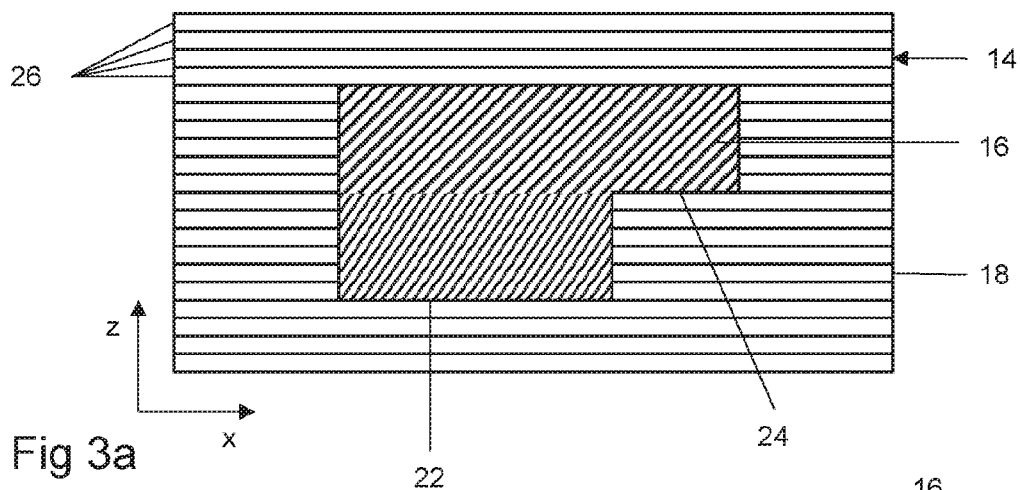
FIG. 3a shows an example of a build model comprising an object model.

A cross-section in the x-z plane of an example build model 14 is illustrated in FIG. 3a. The build model 14 comprises an object model 16 arranged within a virtual volume 18. The object model 16 comprises a first surface 22 classified as a flat bottom surface and a second surface 24 classified as a flat bottom surface. The first surface 22 is a base of the object model 16. The second surface 24 is a base of an over-hanging portion of the object model 16. The build model 14 is divided into a plurality of cross-sectional layers 26, each layer corresponding to a layer of build material and including a pattern of fluid agent deposition for building a build cake according to the build model 14 in an ensuing additive manufacturing process.

In this example the first surface 22 is larger than the second surface 24. In this case the threshold is such that both surfaces 22,24 are categorised as flat bottom surfaces, but in other example the threshold area may be such that surface 24 is not characterised as a flat bottom surface.

Figure 3B:
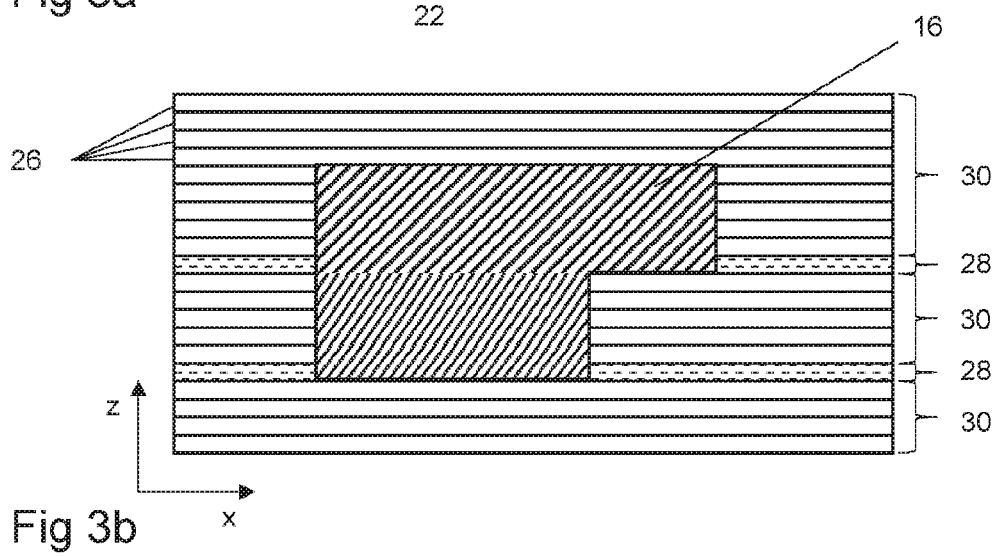
FIG. 3b shows an example of a build model comprising an object model with bulk and base characteristics assigned.

FIG. 3b illustrates the example build model of FIG. 3a wherein a set of base layers 28 and a set of bulk layers 30 have been identified within cross-sectional layers 26. The set of base layers 28 comprise the first and second surfaces 22,24 of the object model 16. The set of bulk layers 30 comprise the remainder of the cross-sectional layers 26. A bulk characteristic is assigned to the set of bulk layers 30 and a base characteristic is assigned to the set of base layers 28.

An additive manufacturing apparatus is instructed to build a build cake according to the build model, layers and assigned characteristics, such that fluid agent is deposited at a first rate for the set of bulk layers 30 having the bulk characteristic and a second rate for the set of base layers 28 having the base characteristic, where the second rate is slower than the first rate.

Figure 3C:
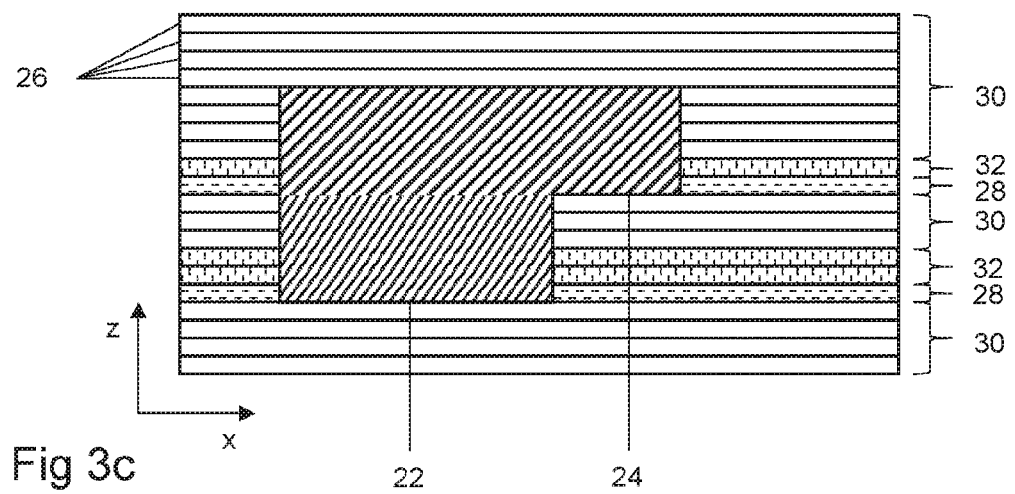
FIG. 3c shows an example of a build model comprising an object model with bulk, base and transition characteristics assigned.

FIG. 3c illustrates the example build model of FIG. 2a wherein a set of base layers 28, a set of bulk layers 30 and a set of transition layers 32 have been identified within the build model 14. The set of transition layers 32 in this example comprises three transition layers per base layer 22,24. A transition characteristic is assigned to the set of transition layers 32, and the additive manufacturing apparatus is instructed to build a build cake according to the build model, layers and assigned characteristics, such that fluid agent is deposited at a third rate for the set of transition layers 32 having the transition characteristic, wherein the third rate is slower than the first.

In this example two transition layers 32 are provided above the base layer 28 comprising the first surface 22 and one transition layer 32 is provided above the base layer 28 comprising the second surface 24. In other examples the number of transition layers above each base layer may be the same. In yet further examples some base layers may have no transition layers above.

Figure 4:
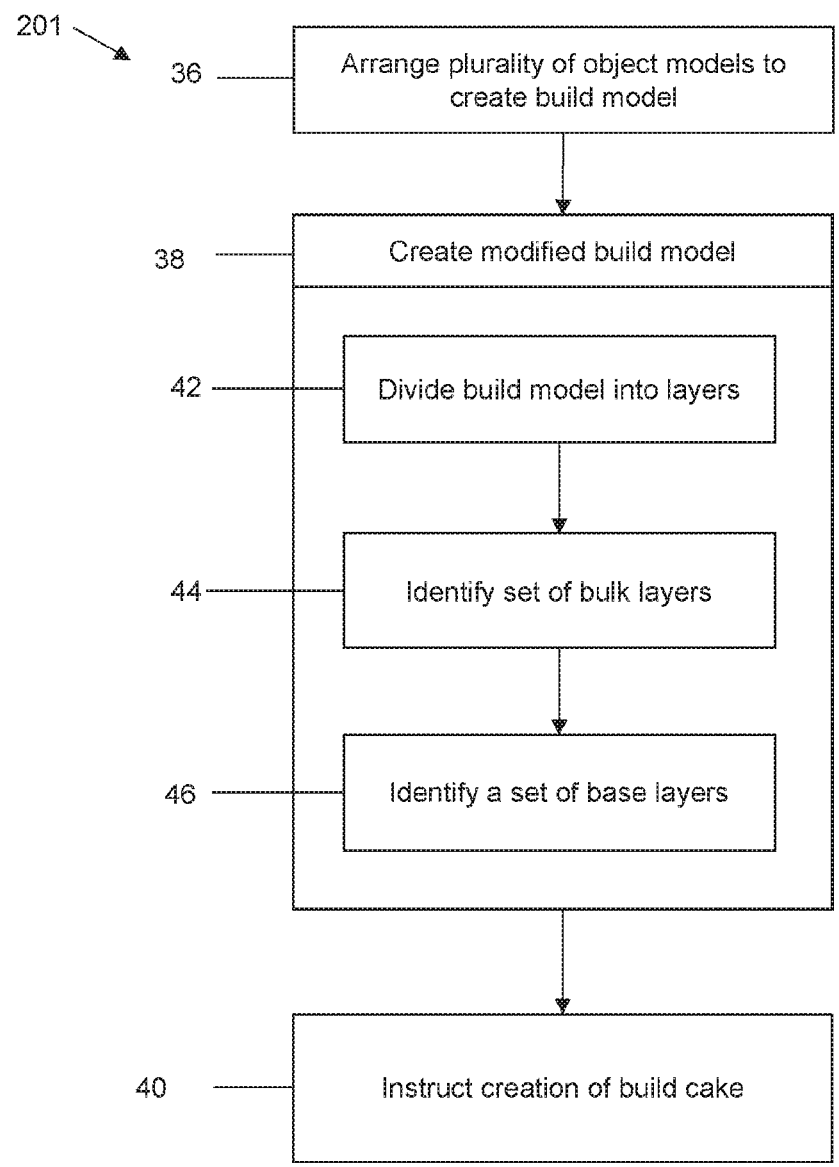
FIG. 4 shows a flowchart of an example method of instructing an additive manufacturing apparatus to build a build cake comprising a plurality of objects.

FIG. 4 shows a flowchart 201 of an example method of instructing an additive manufacturing apparatus to build a build cake comprising a plurality of objects. The method is similar to the methods set out above except that it comprises creating 36 a build model by arranging a plurality of object models within a virtual volume; modifying 38 the build model; and instructing 40 an additive manufacturing apparatus to build a build cake according to the build model, layers and assigned characteristics.

Creating 38 a modified build model comprises dividing 42 a build model into cross-sectional layers along a vertical axis, the layers representing layers to be built in an additive manufacturing process; identifying 44 a set of base layers, each of the base layers comprising a flat bottom surface of the plurality of object models, and assigning a base characteristic to the set of base layers; and identifying 46 a set of bulk layers from the layers, the set of bulk layers excluding the set of base layers, and assigning a bulk characteristic to the set of bulk layers.

The presence of a plurality of build objects may result in a greater number of base layers being identified in the modified build model and this may result in an increase in the time taken to complete the build of a build cake.

In some examples the plurality of object models may be arranged in the build model such that flat bottom surfaces of two of the object models are aligned, thereby positioning them within a common base layer.

In some examples the arranging of the objects within the build model comprises translating the object models within the build model to align flat bottom surfaces in a common layer. The arranging may alternatively, or additionally, comprise rotating the object models within the build model. In some examples the object model may not be completely free to rotate or translate due to quality or technical constraints, for example a predetermined distance may be specified between object models. The arranging may be carried out automatically, or manually by an operator, or through a combination of these.

The plurality of object models may be arranged within the virtual volume such that the number of layers in the set of base layers may be minimised. This may be achieved by analysing the plurality of objects prior to arranging them, or by repeatedly arranging the plurality of objects, counting the base layers to arrive at a minimum number.

An additive manufacturing apparatus is then instructed to build a build cake according to the modified build model, which includes the layers and assigned characteristics, such that a fluid agent is deposited at a first rate for the set of bulk layers having the bulk characteristic and a second rate for the set of base layers having the base characteristic, wherein the second rate is slower than the first. Hence, aligning flat bottom surfaces of the plurality of object models reduces the total time for building a build cake as the number of base layers for which fluid agent is deposited at the slower rate is reduced.

Figure 5A:
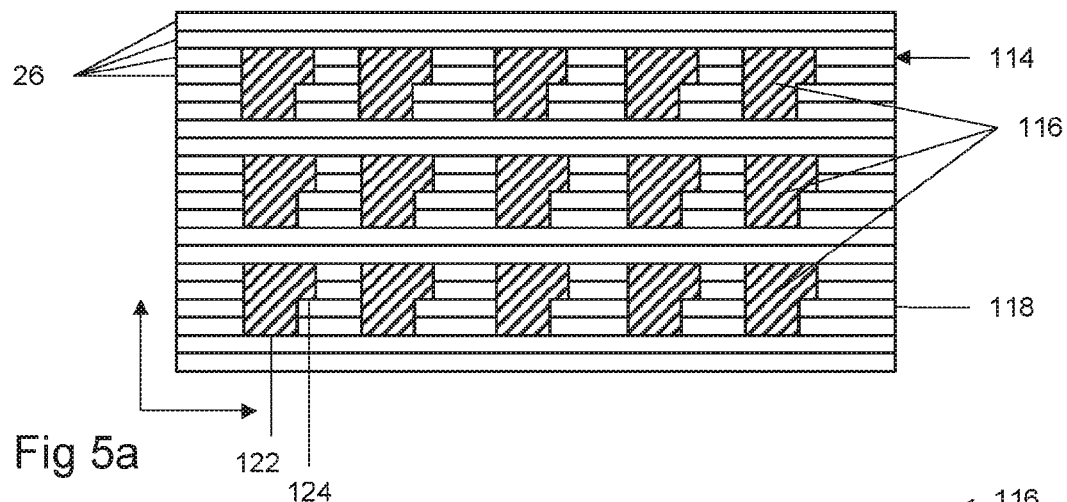
FIG. 5a shows an example of a build model comprising a plurality of object models.

FIG. 5a shows a cross-section in the x-z plane of an example of a build model 114 comprising a plurality of object models 116 arranged within a virtual volume 118. The plurality of object models 116 each comprise a first surface 122 and a second surface 124, both of which are classified as flat bottom surfaces. In this example, the object models have an identical shape, however it will be readily appreciated that in other examples the object models could have different shapes. Object models 116 have been arranged into a grid pattern comprising three rows such that the first surfaces 22 of some objects 116 in rows are vertically aligned in a common layer and the second surfaces 24 of those objects are vertically aligned in a common layer. The build model 114 has been divided into layers 26 which represent layers to be built in an ensuing additive manufacturing process.

Figure 5B:
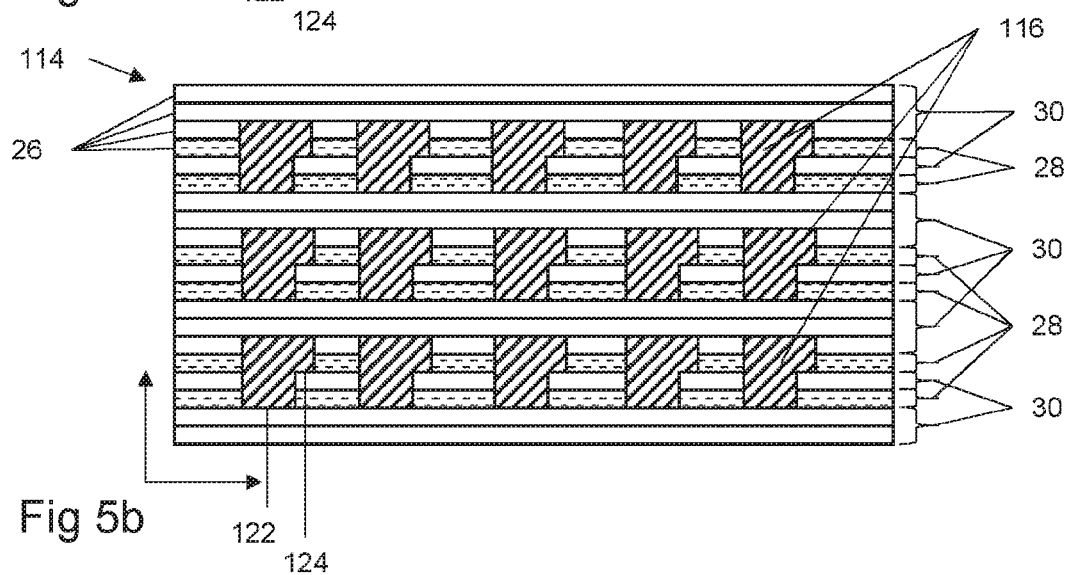
FIG. 5b shows an example of a build model comprising a plurality of object models with bulk and base characteristics assigned.

FIG. 5b shows a cross-section in the x-z plane of the build model 14. A set of base layers 28 have been identified in the build model, the set of base layers 28 comprising the first and second surfaces 22,24. Due the alignment of objects 116 in rows, and the sharing of layers, the set of base layers 28 in this example comprises six base layers. A set of bulk layers 30 have also been identified. In this example, the set of bulk layers comprise the remainder of the layers 26 excluding the set of base layers 28. The base layers 28 and bulk layers 30 are assigned a base characteristic and bulk characteristic respectively. The additive manufacturing apparatus is then instructed to build a build cake according to the build model 14 and assigned characteristics, such that a fluid agent is deposited at a first rate for the set of bulk layers having the bulk characteristic and a second rate for the set of base layers having the base characteristic, wherein the second rate is slower than the first rate.

Figure 5C:
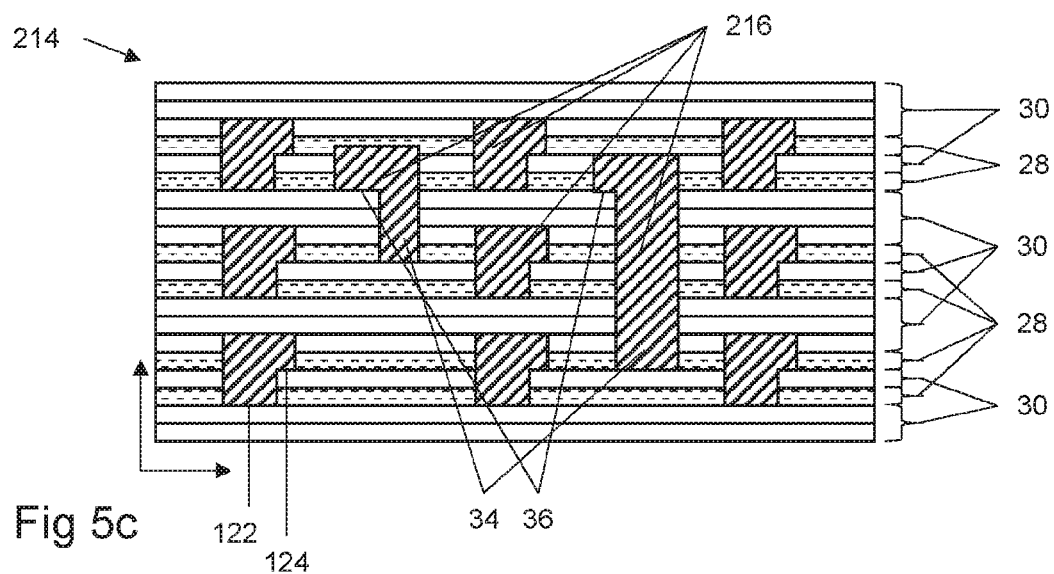
FIG. 5c shows another example of a build model comprising a plurality of object models with bulk and base characteristics assigned.

FIG. 5c shows a cross-section in the x-z plane of a build model 214. As with FIGS. 5a and 5b there are a plurality of object models 216, but in this example they are not all identical. Some of the objects 216 are the same as the objects 116 of FIG. 3b, but objects 34 are not the same. The objects 34 each in include surfaces 36 which are classified as flat bottom surfaces. Although the objects 34 are not identical with the objects 116 they have been arranged such that the surfaces 36 share a common layer with first or second surfaces 122,124 of other objects 216 so that the number of base layers is reduced. As with FIG. 5b, a set of base layers 28 and a set of bulk layers 30 have been identified.

In other examples transition layers could be identified within build models 114, 214 of FIGS. 5b and 5c of as was done in FIG. 3c.

Figure 6:
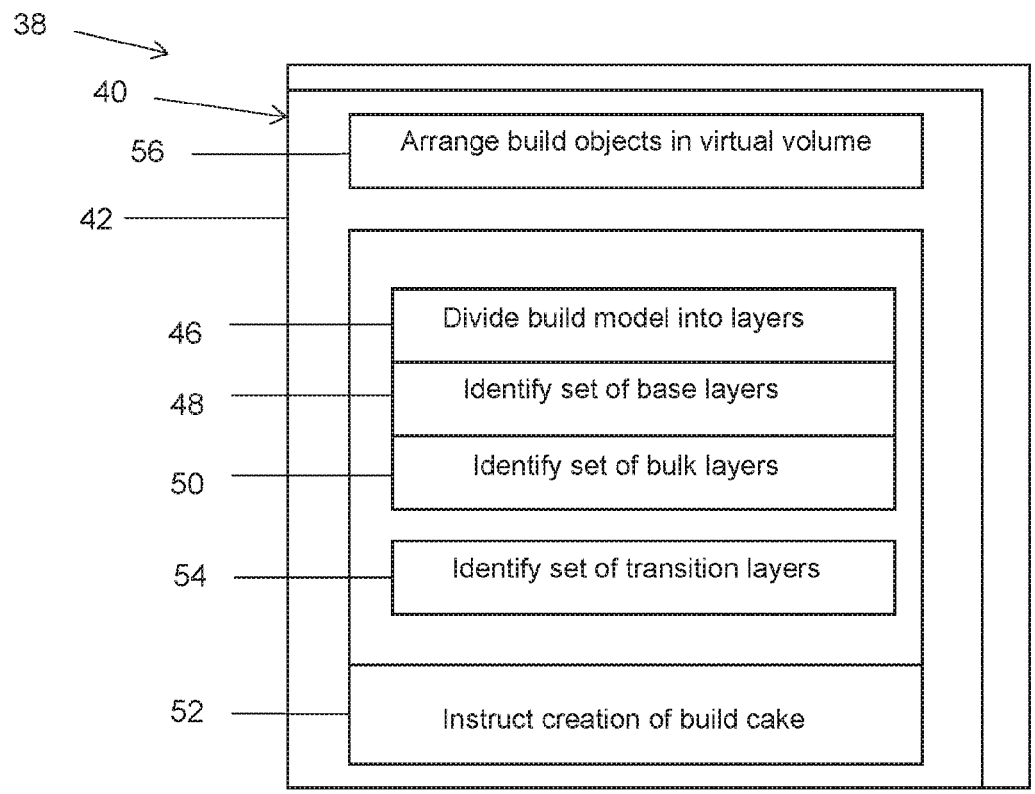
FIG. 6 shows an example of an apparatus comprising a controller.

FIG. 6 shows an example of an apparatus 38 comprising a controller 40. The controller 40 may be suitable for use as a controller in an additive manufacturing system. In this example the controller 40 comprises a set of instructions 42, including:

Instructions 46 to divide a build model comprising an object model arranged within a virtual volume into cross-sectional layers along a vertical axis, the layers representing layers to be built in an additive manufacturing process;

Instructions 48 to identify a set of base layers from the layers, each of the base layers comprising a flat bottom surface of the object model and assigning a base characteristic to the set of base layers; and Instructions 50 to identify a set of bulk layers, the set of bulk layers excluding the set of base layers, and assigning a second characteristic to the set of base layers of the build model.

The controller including instructions 52 to instruct an additive manufacturing apparatus to build a build cake according to the build model, layers and assigned characteristics, such that a fluid agent is deposited at a first rate for the set of bulk layers having the first characteristic and a second rate for the set of base layers having the second characteristic, wherein the second rate is slower than the first rate.

In some examples the instructions include instructions 54 to identify a set of transition layers, each of the transition layers being adjacent, and above, a base layer or a transition layer, the set of bulk layers excluding the set of transition layers, and assign a transition characteristic to the set of transition layers. Wherein the additive manufacturing apparatus is instructed to build the build cake according to the build model, layers and assigned characteristics, such that the fluid agent is deposited at a third rate for the set of transition layers having the transition characteristic, wherein the third date is slower than the first.

In some examples the controller 40 includes instructions to create a build model by arranging a plurality of object models within a virtual volume and to arrange the plurality of object models within the virtual volume such that flat bottom surfaces of two object models are vertically aligned.

Figure 7:
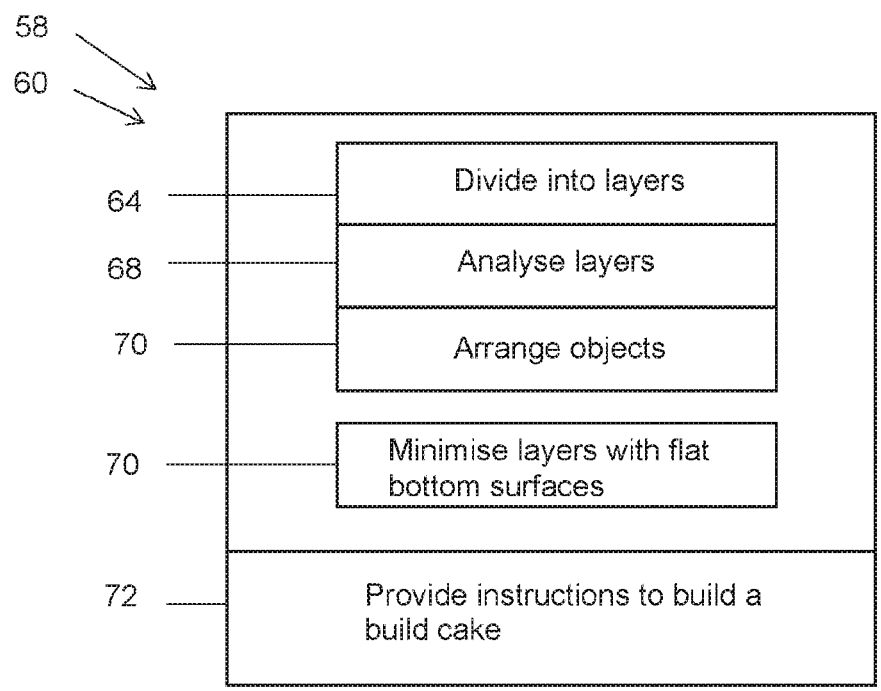
FIG. 7 shows an example of a non-transitory machine-readable storage medium.

FIG. 7 shows an example of a non-transitory machine readable storage medium 58. The non-transitory machine readable storage medium 58 encoded with instructions 60 executable by a processor and comprising:

Dividing 64 the virtual volume and object models into cross-sectional layers along a vertical axis, the layers representing layers to be built in an additive manufacturing process;

Analysing 66 the layers to identify flat bottom surfaces of the object models;

Arranging 68 the object models within the virtual volume such that flat bottom surfaces of two of the object models are vertically aligned in a common layer.

In some examples the instructions 60 may also include instructions 72 to provide instructions to an additive manufacturing system to build a build cake according to the build model, layers and assigned characteristics.

In some examples the object models may be arranged within the virtual volume such that the number of layers including a flat bottom surface of is minimised.

The invention claimed is:

1. An additive manufacturing method comprising:
   dividing a build model comprising an object model for a part to be additively manufactured and arranged within a virtual volume corresponding to a build chamber of an additive manufacturing apparatus into cross-sectional layers along a vertical axis from a bottom of the build chamber towards a top of the build chamber, the layers representing layers to be built by the additive manufacturing apparatus in an additive manufacturing process;
   identifying a plurality of sets of base layers, each set of the base layers comprising a flat bottom surface of the object model for the part perpendicular to the vertical axis and assigning a base characteristic to the sets of base layers, where one or more of the sets of base layers are not at a bottom-most portion of the part;
   identifying a set of bulk layers, the set of bulk layers excluding the set of base layers, and assigning a bulk characteristic to the set of bulk layers; and
   instructing the additive manufacturing apparatus to build a build cake according to the build model, layers and assigned characteristics, such that the additive manufacturing process comprises:
      depositing one or more initial layers of build material powder at the bottom of the build chamber upwards, without applying any fluid agent to the initial layers; and
      after depositing the initial layers, repeatingly:
         depositing a layer of the build material powder over a most recently deposited layer of the build material powder;
         in a case where the layer corresponds to one of the set of bulk layers, selectively ejecting a fluid agent on the deposited layer at a first rate in correspondence with the object model for the part; and
         in a case where the layer corresponds to one of the sets of base layers, selectively ejecting the fluid agent on the deposited layer at a second rate slower than the first rate, in correspondence with the object model for the part,
      until the part has been formed,
   wherein a fluid agent ejection rate varies from the bottom of the build chamber towards the top of the build chamber in correspondence with the cross-sectional layers being the base layers or the bulk layers.

2. The additive manufacturing method of claim 1, further comprising:
   identifying a set of transition layers, each of the transition layers being adjacent to and above, a layer of the set of base layers or another transition layer, the set of bulk layers excluding the set of transition layers; and
   assigning a transition characteristic to the set of transition layers,
   wherein the additive manufacturing process further comprises:
      in a case where the layer corresponds to one of the set of transition layers, selectively ejecting the fluid agent on the deposited layer at a third rate slower than the first rate.

3. The additive manufacturing method of claim 2, wherein the second rate is the same as the third rate.

4. The additive manufacturing method of claim 2, wherein the second rate is slower than the third rate.

5. The additive manufacturing method of claim 1, wherein the fluid agent ejection rate is determined by a number of passes of a print head of the additive manufacturing apparatus over the layer such that the print head deposits a predetermined volume of fluid agent per unit area, and the base characteristic is indicative of a greater number of passes than the bulk characteristic.

6. The additive manufacturing method of claim 1, wherein the fluid agent ejection rate is determined by the time taken to pass a print head of the additive manufacturing apparatus over the layer such that the print head deposits a predetermined volume of fluid agent per unit area, and the base characteristic is indicative of a longer time than the bulk characteristic.

7. The additive manufacturing method of claim 1, wherein the object model is a first object model, and the method further comprises creating the build model by arranging a plurality of object models including the first object model within the virtual volume.

8. The additive manufacturing method of claim 7, wherein the plurality of object models are arranged within the virtual volume such that flat bottom surfaces of two object models are vertically aligned.

9. The additive manufacturing method of claim 8, wherein the plurality of object models are arranged within the virtual volume such that the number of layers in the set of base layers is minimized.

10. The additive manufacturing method of claim 1, wherein the method is automated.

11. A non-transitory machine-readable storage medium storing instructions executable by a processor to perform processing comprising:
   dividing a build model comprising an object model for a part to be additively manufactured and arranged within a virtual volume corresponding to a build chamber of an additive manufacturing apparatus into cross-sectional layers along a vertical axis from a bottom of the build chamber towards a top of the build chamber, the layers representing layers to be built by the additive manufacturing apparatus in an additive manufacturing process;
   identifying a plurality of sets of base layers, each set of the base layers comprising a flat bottom surface of the object model for the part perpendicular to the vertical axis and assigning a base characteristic to the sets of base layers, where one or more of the sets of base layers are not at a bottom-most portion of the part;
   identifying a set of bulk layers, the set of bulk layers excluding the set of base layers, and assigning a bulk characteristic to the set of bulk layers; and
   instructing the additive manufacturing apparatus to build a build cake according to the build model, layers and assigned characteristics, such that the additive manufacturing process comprises:
      depositing one or more initial layers of build material powder at the bottom of the build chamber upwards, without applying any fluid agent to the initial layers; and
      after depositing the initial layers, repeatingly:
         depositing a layer of the build material powder over a most recently deposited layer of the build material powder;
         in a case where the layer corresponds to one of the set of bulk layers, selectively ejecting a fluid agent on the deposited layer at a first rate in correspondence with the object model for the part; and in a case where the layer corresponds to one of the sets of base layers, selectively ejecting the fluid agent on the deposited layer at a second rate slower than the first rate, in correspondence with the object model for the part, until the part has been formed, wherein a fluid agent ejection rate varies from the bottom of the build chamber towards the top of the build chamber in correspondence with the cross-sectional layers being the base layers or the bulk layers.

12. The non-transitory machine-readable storage medium of claim 11, wherein the processing further comprises:

identifying a set of transition layers, each of the transition layers adjacent to and above, a layer of the set of base layers or another transition layer, the set of bulk layers excluding the set of transition layers; and assigning a transition characteristic to the set of transition layers, wherein the additive manufacturing process further comprises:

in a case where the layer corresponds to one of the set of transition layers, selectively ejecting the fluid agent on the deposited layer at a third rate slower than the first rate.

13. The non-transitory machine-readable storage medium of claim 12, wherein the second rate is the same as the third rate.

14. The non-transitory machine-readable storage medium of claim 12, wherein the second rate is slower than the third rate.

15. The non-transitory machine-readable storage medium of claim 11, wherein the fluid agent ejection rate is determined by either:

a number of passes of a print head of the additive manufacturing apparatus over the layer such that the print head deposits a predetermined volume of fluid agent per unit area, and the base characteristic is indicative of a greater number of passes than the bulk characteristic; or the time taken to pass the print head of the additive manufacturing apparatus over the layer such that the print head deposits a predetermined volume of fluid agent per unit area, and the base characteristic is indicative of a longer time than the bulk characteristic.

16. A system comprising:

a processor; and a memory storing instructions executable by the processor to perform processing comprising:

dividing a build model comprising an object model for a part to be additively manufactured and arranged within a virtual volume corresponding to a build chamber of an additive manufacturing apparatus into cross-sectional layers along a vertical axis from a bottom of the build chamber towards a top of the build chamber, the layers representing layers to be built by the additive manufacturing apparatus in an additive manufacturing process;

identifying a plurality of sets of base layers, each set of the base layers comprising a flat bottom surface of the object model for the part perpendicular to the vertical axis and assigning a base characteristic to the sets of base layers, where one or more of the sets of base layers are not at a bottom-most portion of the part;

identifying a set of bulk layers, the set of bulk layers excluding the set of base layers, and assigning a bulk characteristic to the set of bulk layers; and instructing the additive manufacturing apparatus to build a build cake according to the build model, layers and assigned characteristics, such that the additive manufacturing process comprises:

depositing one or more initial layers of build material powder at the bottom of the build chamber upwards, without applying any fluid agent to the initial layers; and after depositing the initial layers, repeatedly:

depositing a layer of the build material powder over a most recently deposited layer of the build material powder;

in a case where the layer corresponds to one of the set of bulk layers, selectively ejecting a fluid agent on the deposited layer at a first rate in correspondence with the object model for the part; and in a case where the layer corresponds to one of the sets of base layers, selectively ejecting the fluid agent on the deposited layer at a second rate slower than the first rate, in correspondence with the object model for the part, until the part has been formed, wherein a fluid agent ejection rate varies from the bottom of the build chamber towards the top of the build chamber in correspondence with the cross-sectional layers being the base layers or the bulk layers.

17. The system of claim 16, wherein the processing further comprises:

identifying a set of transition layers, each of the transition layers adjacent to and above, a layer of the set of base layers or another transition layer, the set of bulk layers excluding the set of transition layers; and assigning a transition characteristic to the set of transition layers, wherein the additive manufacturing process further comprises:

in a case where the layer corresponds to one of the set of transition layers, selectively ejecting the fluid agent on the deposited layer at a third rate slower than the first rate.

18. The system of claim 16, wherein the fluid agent ejection rate is determined by either:

a number of passes of a print head of the additive manufacturing apparatus over the layer such that the print head deposits a predetermined volume of fluid agent per unit area, and the base characteristic is indicative of a greater number of passes than the bulk characteristic; or the time taken to pass the print head of the additive manufacturing apparatus over the layer such that the print head deposits a predetermined volume of fluid agent per unit area, and the base characteristic is indicative of a longer time than the bulk characteristic.

19. The system of claim 16, wherein the processor and the memory are part of the additive manufacturing apparatus.

20. The system of claim 16, wherein the processor and the memory are part of a device other than the additive manufacturing apparatus.

* * * * *